(12) United States Patent
De Lajarte

(10) Patent No.: US 7,787,761 B2
(45) Date of Patent: Aug. 31, 2010

(54) LENS ASSEMBLY

(75) Inventor: Gilles Dufaure De Lajarte, Munich (DE)

(73) Assignee: STMicroelectronics (Research and Development) Limited, Marlow-Buckinghamshire (GB)

( * ) Notice: Subject to any disclaimer, the term of this patent is extended or adjusted under 35 U.S.C. 154(b) by 181 days.

(21) Appl. No.: 11/972,816

(22) Filed: Jan. 11, 2008

(65) Prior Publication Data

US 2009/0190912 A1  Jul. 30, 2009

(30) Foreign Application Priority Data

Jan. 11, 2007   (EP) .................................. 07000558

(51) Int. Cl.
G03B 7/00    (2006.01)
G03B 7/099   (2006.01)
H04N 5/225   (2006.01)
G02B 3/00    (2006.01)
G02B 13/00   (2006.01)

(52) U.S. Cl. ....................... 396/241; 396/275; 348/342; 359/722

(58) Field of Classification Search ................. 396/275, 396/241, 529; 348/340, 342; 359/722, 819
See application file for complete search history.

(56) References Cited

U.S. PATENT DOCUMENTS

2004/0105173 A1* 6/2004 Yamaguchi et al. ......... 359/793

FOREIGN PATENT DOCUMENTS

| DE | 19910725 | 10/1999 |
|----|----------|---------|
| EP | 1357414  | 10/2003 |
| EP | 1416306  | 5/2004  |
| EP | 1443755  | 8/2004  |

* cited by examiner

*Primary Examiner*—Rochelle-Ann J Blackman
(74) *Attorney, Agent, or Firm*—Lisa K. Jorgenson; Allen, Dyer, Doppelt, Milbrath & Gilchrist, P.A.

(57) ABSTRACT

A lens assembly for an imaging device may include a lens member for focusing external radiation towards an image sensor of the imaging device, and a screen member adjacent the lens member. A transparent portion may be positioned between the lens member and the external radiation and may have first and second surfaces. A first mask member may be positioned at the first surface of the transparent portion and may have an inlet therein. A second mask member may be positioned at the second surface of the transparent portion and may have an outlet therein. The outlet may be smaller than the inlet.

23 Claims, 1 Drawing Sheet

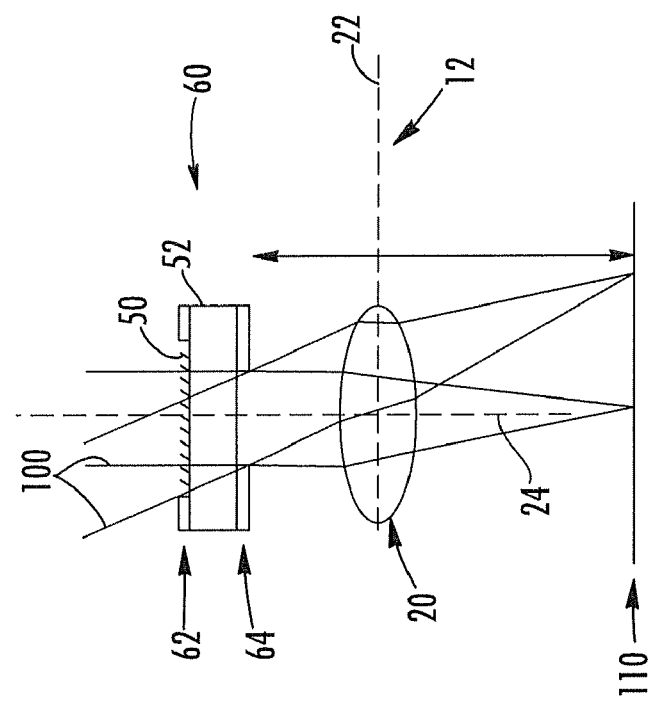
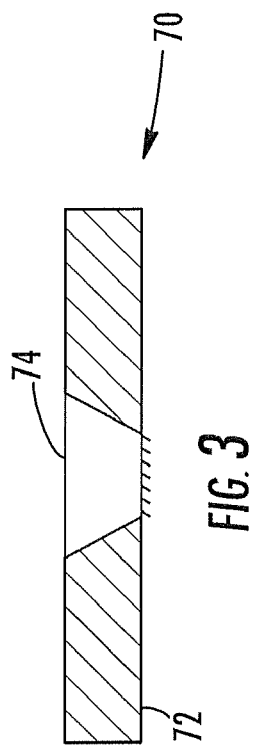
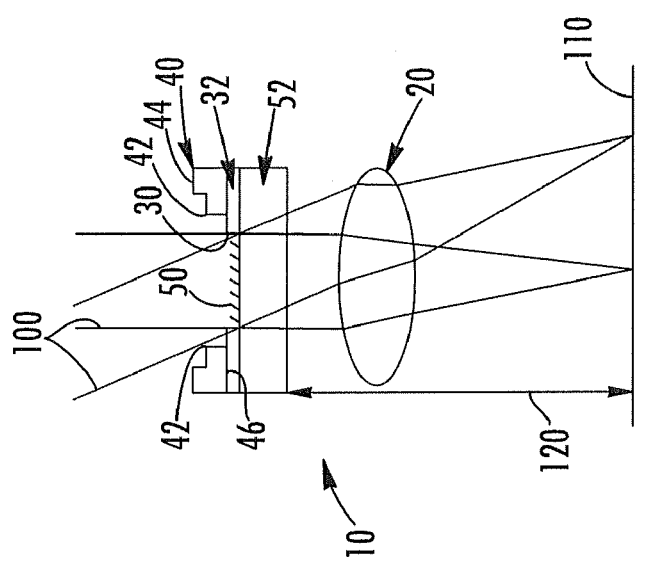

LENS ASSEMBLY

FIELD OF THE INVENTION

The present invention relates to a lens assembly for an imaging device. In particular, but not exclusively, the invention relates to a lens assembly for an imaging device which includes a solid state image sensor.

BACKGROUND OF THE INVENTION

Imaging devices including solid state image sensors are being incorporated into low cost cameras and other handheld devices, such as mobile cellular telephones and personal digital assistants. A primary concern is to minimize the space utilized by the imaging device. It is also desirable to minimize the cost of the imaging device.

The image sensor typically includes a focussing lens for reproducing an image of the subject. The lens may be a single lens element or a compound lens formed by two or more elements. The lens may be formed from glass or a transparent plastic material.

Other separate components which are typically included in a lens assembly are an aperture, baffle and an infra-red filter. The aperture limits the quantity of light that reaches the lens by determining the diameter of light radiation. The position of the aperture is important since it is typically desirable to maximize the distance between the aperture and the image sensor. The aperture is typically provided by an opaque plastic material.

The baffle is provided to delimit the direction or angle of the light which passes through the aperture. The baffle typically requires a substantial thickness, typically around 0.3 mm, to have a suitable profile which can provide this delimiting function. The baffle is also typically formed from an opaque plastic material.

The infra-red filter is present to prevent infrared radiation impinging on the image sensor, and is provided on a glass plate, typically 0.3 mm thick. The glass plate and infra-red filter may be provided at a rear surface of the lens, between the lens and sensor, or they may be located near the aperture. In either position, the glass plate limits the space available for the lens. The infra-red filter comprises a number of coats, typically around 40 layers, of a suitable material provided on the glass plate. However, the overall thickness of the coating is still small, typically about 5 µm. The infra-red coating is typically not provided on the lens as the thermal co-efficient of expansion is too great and cracking of the coating would result.

SUMMARY OF THE INVENTION

According to a first aspect of the present invention there is provided a lens assembly for an imaging device comprising a lens member for focusing external radiation towards an image sensor of the imaging device, and a screen member comprising a substantially transparent portion interposing the lens member and the external radiation. The lens assembly may also include an aperture, and a baffle or baffle means. The screen member may provide at least one of the aperture and the baffle.

The term "transparent" is intended to mean that visible light is transmitted. However, other wavelengths of light, such as infra-red light, may be blocked directly by the transparent portion of the screen member.

The lens assembly may include an optical filter. The optical filter may comprise an infra-red filter. The infra-red filter may comprise one or more coatings which inhibit the transmission of infrared electromagnetic radiation.

The transparent portion may provide the optical filter. The coating or each coating may be provided at the transparent portion.

The screen member is substantially planar. The transparent portion may be formed from glass. Alternatively, the transparent portion may be formed from a polymer material.

The lens member may comprise a single lens. Alternatively, the lens member may comprise a plurality of lenses. The lens member may define a major plane and an optical axis which is normal to the major plane.

The screen member may provide the baffle means. The baffle means may define a passage for the external radiation. The passage may have an inlet and an outlet, the inlet being greater than the outlet to define a maximum angle of the external radiation relative to the optical axis. Each of the inlet and the outlet may be substantially circular and the diameter of the inlet is typically greater than the diameter of the outlet.

The screen member may comprise a first mask member provided at the transparent portion. The first mask member may be provided at a first surface of the transparent portion. Alternatively, the first mask member may be embedded within the transparent portion. The screen member may comprise a second mask member. The second mask member may be provided at a second surface of the transparent portion. The first and second mask member may provide the inlet and outlet of the passage.

One or both of the first and second mask members may comprise a chrome material. Alternatively, one or both of the first and second mask members may comprise an opaque epoxy material.

Alternatively, the transparent portion may be substantially conical. The transparent portion may taper in diameter in a step-wise manner to provide a conical transmission of light. The screen member may include an opaque surround member and the transparent portion may comprise an insert which is provided within the surround member.

The lens assembly may include a barrel for supporting the lens member.

According to a second aspect of the present invention there may be provided an imaging device including a lens assembly in accordance with the first aspect of the invention.

The imaging device may include an image sensor. The image sensor may comprise a solid state image sensor. Preferably the image sensor may comprise a CMOS image sensor. Alternatively, the image sensor may comprise a CCD image sensor.

BRIEF DESCRIPTION OF THE DRAWINGS

An embodiment of the invention will now be described, by way of example only, with reference to the drawings, in which:

FIG. 1 is a schematic side view of a prior art lens assembly and an image sensor;

FIG. 2 is a schematic side view of a lens assembly according to a first embodiment of the invention and an image sensor; and FIG. 3 is a sectional side view of a screen member of a lens assembly according to a second embodiment of the invention.

DETAILED DESCRIPTION OF THE PREFERRED EMBODIMENTS

FIG. 1 shows a known lens assembly 10 focusing external radiation 100 towards an image sensor 110. The lens assembly 10 comprises a lens member 20, an aperture 30 and a baffle 40.

The aperture 30 is provided in a planar member 32 formed from black plastic and which is relatively thin. The diameter of the aperture 30 determines the quantity of light reaching the lens member 20. As shown in FIG. 1, this quantity is substantially independent of the direction or angle of the light 100 because the planar member 32 is thin.

The baffle 40, also formed from a black plastic material, delimits the direction or angle of the light 100 which passes through the aperture 30. The baffle 40 itself provides a passage for light 100. An upper surface 44 of the battle 40 can be considered to be an inlet for the passage while a lower surface 46 of the baffle 40 can be considered to be an outlet for the passage. The inlet has a greater diameter than the outlet and this defines a maximum angle of the light 100. Light 100 which is at a sufficiently acute angle relative to the lens assembly 10 will strike a corner portion 42 of the baffle 40 and will not pass through the aperture 30. The baffle 40 has a thickness of about 0.3 mm to achieve this delimiting function.

An infra-red (IR) filter 50 is present to prevent IR radiation impinging on the image sensor 110. The IR filter 50 is formed from around 40 coats of a suitable material provided on a glass plate 52, which is typically 0.3 mm thick. The glass plate 52 is located between the aperture 30 and lens member 20. The presence of the glass plate 52 limits the maximum focal distance 120 between the aperture 30 and the image sensor 110.

FIG. 2 shows a lens assembly 12 according to a first embodiment of the invention. Like features are given like reference numerals. As before, the lens assembly 12 includes a lens member 20. However, the conventional aperture 30 and baffle 40 have been eliminated.

The lens assembly 12 includes a screen member 60 which includes a substantially transparent portion interposing the lens member 20 and the external radiation 100. As is explained below, the screen member 60 provides the aperture and baffle means. Also, the transparent portion is provided by a glass plate 52 which is essentially the same as that for the first embodiment. This glass plate 52 can also be provided with the IR filter 50.

A first mask member 62 formed from an opaque material such as chrome is provided at the upper surface of the glass plate 52. A second mask member 64 formed from the same material is provided at the lower surface of the glass plate 52. The first and second mask members now provide the passage for light 100. The first mask member 62 has an aperture which defines the inlet for the passage, while the second mask member 64 has an aperture which defines the outlet for the passage. The inlet has a greater diameter than the outlet.

In this manner, the screen member provides the baffle means. The lens member 20 can be considered to define a major plane 22 and an optical axis 24 which is normal to the major plane 22. Although each of the first and second mask members are thin, they are spaced apart by the thickness of the glass plate 52. This spacing, and the relative diameters of the apertures of the first and second mask members, co-operate to define maximum angle of light 100 relative to the optical axis 24.

Since the second mask member 64 is thin, it can also be used as the aperture of the lens assembly 12. Alternatively, a separate aperture may be provided.

FIG. 3 shows the screen member 70 of a lens assembly according to a second embodiment of the invention. In this embodiment, the screen member 70 comprises an opaque surround member 72 and a transparent portion which comprises a frusto-conical insert 74 provided within the surround member 72. An IR filter coating 50 is provided on one surface of the screen member 70. Therefore, the screen member 70 again provides the baffle means, as well as the optical filter.

Various modifications and improvements can be made without departing from the scope of the present invention.

That which is claimed:

1. A lens assembly for an imaging device comprising:
   a lens member for focusing external radiation towards an image sensor; and
   a screen member adjacent said lens member and comprising
      a transparent portion positioned between said lens member and the external radiation, and having first and second spaced apart surfaces defining a uniform thickness of said transparent portion,
      a first mask member positioned at the first surface of the transparent portion and having an inlet therein, and
      a second mask member positioned at the second surface of the transparent portion and having an outlet therein, the outlet being smaller than the inlet;
      said first and second mask members being uniformly spaced apart by the uniform thickness of said transparent portion.

2. The lens assembly according to claim 1 wherein the inlet has a greater diameter than the outlet.

3. The lens assembly according to claim 1 further comprising an infra-red filter adjacent said transparent portion.

4. The lens assembly according to claim 1 wherein said transparent portion comprises a glass plate.

5. The lens assembly according to claim 1 wherein said second mask member defines an aperture.

6. An imaging device comprising:
   an image sensor; and
   a lens assembly adjacent said image sensor and comprising
      a lens member for focusing external radiation towards said image sensor of the imaging device,
      a screen member adjacent said lens member and comprising
         a transparent portion positioned between said lens member and the external radiation, and having first and second spaced apart surfaces defining a uniform thickness of said transparent portion,
         a first mask member positioned at the first surface of the transparent portion and having an inlet therein, and
         a second mask member positioned at the second surface of the transparent portion and having an outlet therein, the outlet being smaller than the inlet;
         said first and second mask members being uniformly spaced apart by the uniform thickness of said transparent portion.

7. The imaging device according to claim 6 wherein the inlet has a greater diameter than the outlet.

8. The imaging device according to claim 6 wherein said image sensor comprises a CMOS image.

9. The imaging device according to claim 6 wherein said transparent portion comprises a glass plate.

10. The imaging device according to claim 6 wherein said second mask member defines an aperture.

11. A method of making a lens assembly for an imaging device comprising:
 providing a lens member for focusing external radiation towards an image sensor of the imaging device; and
 positioning a screen member adjacent the lens member and comprising
  a transparent portion positioned between the lens member and the external radiation, and having first and second spaced apart surfaces defining a uniform thickness of said transparent portion,
  a first mask member positioned at the first surface of the transparent portion and having an inlet therein, and
  a second mask member positioned at the second surface of the transparent portion and having an outlet therein, the outlet being smaller than the inlet;
  the first and second mask members being uniformly spaced apart by the uniform thickness of the transparent portion.

12. The method according to claim 11 wherein the inlet has a greater diameter than the outlet.

13. The method according to claim 11 further comprising providing an infra-red filter adjacent the transparent portion.

14. The method to claim 11 wherein the screen member further comprises an infra-red filter adjacent the first surface.

15. The method according to claim 11 wherein the transparent portion comprises a glass plate.

16. The method according to claim 11 wherein the second mask member defines an aperture.

17. A lens assembly for an imaging device comprising:
 a lens member for focusing external radiation towards an image sensor; and
 a screen member adjacent said lens member and comprising
  an opaque surround member having an opening therein, and
  a transparent frusto-conical insert within said opaque surround member opening.

18. The lens assembly according to claim 17 further comprising an infra-red filter adjacent said transparent frusto-conical insert.

19. The lens assembly according to claim 17 wherein said transparent frusto-conical insert comprises a glass transparent frusto-conical insert.

20. The lens assembly according to claim 17 wherein said opaque surround member defines an aperture.

21. An imaging device comprising:
 an image sensor; and
 a lens assembly adjacent said image sensor and comprising
  a lens member for focusing external radiation towards said image sensor, and
  a screen member adjacent said lens member and comprising
   an opaque surround member having an opening therein, and
   a transparent frusto-conical insert coupled within said opaque surround member opening.

22. The imaging device according to claim 21 wherein said image sensor comprises a CMOS image sensor.

23. The imaging device according to claim 21 wherein said transparent frusto-conical insert comprises a glass transparent frusto-conical insert.

* * * * *